(12) United States Patent
Sharma et al.

(10) Patent No.: US 10,192,155 B2
(45) Date of Patent: Jan. 29, 2019

(54) MULTI-DIMENSIONAL BARCODE AND METHOD OF, AND SYSTEM FOR, ELECTRO-OPTICALLY READING THE BARCODE BY IMAGE CAPTURE

(71) Applicant: Zortag, Inc., Great Neck, NY (US)

(72) Inventors: Satya Prakash Sharma, East Setauket, NY (US); Joseph Marino, Port Jefferson Station, NY (US)

(73) Assignee: Zortag, Inc., Great Neck, NY (US)

(*) Notice: Subject to any disclaimer, the term of this patent is extended or adjusted under 35 U.S.C. 154(b) by 36 days.

(21) Appl. No.: 15/338,584

(22) Filed: Oct. 31, 2016

(65) Prior Publication Data

US 2018/0121775 A1  May 3, 2018

(51) Int. Cl.
*G06K 19/06* (2006.01)
*G06K 7/10* (2006.01)
*G06K 9/18* (2006.01)

(52) U.S. Cl.
CPC ..... *G06K 19/06037* (2013.01); *G06K 7/10831* (2013.01); *G06K 19/06159* (2013.01); *G06K 9/18* (2013.01)

(58) Field of Classification Search
CPC .................................... G06K 19/06–19/06178
See application file for complete search history.

(56) References Cited

U.S. PATENT DOCUMENTS

| | | | | |
|---|---|---|---|---|
| 6,927,885 B2* | 8/2005 | Staub | ............... | G06K 19/06046 283/86 |
| 7,975,913 B2* | 7/2011 | Kubota | ............... | G06K 5/00 235/375 |
| 8,534,540 B2* | 9/2013 | Gratton | ............. | G06F 17/30879 235/375 |
| 8,715,725 B2* | 5/2014 | Stuck | ................... | A61J 3/007 356/511 |
| 8,758,865 B2* | 6/2014 | Belelie | .................. | B41M 3/16 427/508 |
| 9,135,543 B2* | 9/2015 | Lancaster-Larocque | ................... | G06K 19/06178 |
| 9,864,940 B2* | 1/2018 | Flores | ............... | G06K 19/06037 |
| 2008/0121727 A1* | 5/2008 | Iftime | ..................... | G06K 1/12 235/494 |
| 2008/0151310 A1* | 6/2008 | Kazmaier | ............... | B41M 3/14 358/3.28 |
| 2010/0055423 A1* | 3/2010 | Chretien | .............. | C09D 11/101 428/209 |
| 2013/0260117 A1* | 10/2013 | Hofer | ..................... | G09F 3/005 428/213 |
| 2014/0346231 A1* | 11/2014 | Al-Omari | ........... | G06K 7/1417 235/462.04 |

* cited by examiner

*Primary Examiner* — Christle I Marshall
(74) *Attorney, Agent, or Firm* — Kirschstein, Israel, Schiffmiller & Pieroni, P.C.

(57) ABSTRACT

Light-modifying elements of a multi-dimensional barcode are arranged along first and second directions that are orthogonal to each other in a pattern that stores first and second quantities of information stored in the barcode. Some of the elements have different elevations along a third direction that is orthogonal to the first and second directions to store a third quantity of the information. Some of the elements are colored to store a fourth quantity of the information. A surrounding medium at least partially encases at least some of the elements. The surrounding medium has a characteristic that stores a fifth quantity of the information.

15 Claims, 8 Drawing Sheets

MULTI-DIMENSIONAL BARCODE AND METHOD OF, AND SYSTEM FOR, ELECTRO-OPTICALLY READING THE BARCODE BY IMAGE CAPTURE

BACKGROUND OF THE INVENTION

The present disclosure relates generally to a multi-dimensional barcode and, more particularly, to a method of, and a system for, electro-optically reading the barcode by image capture, and, still more particularly, for authenticating and/or identifying an object associated with the barcode, and/or for storing information relating to the barcode and/or to an object associated with the barcode.

Barcode scanning technology has greatly impacted the lives of consumers and has increased the efficiency of many businesses and organizations, such as supermarkets, department stores, factories, the military, the health industry, the insurance industry, and the like, worldwide. Barcode scanning technology is relatively inexpensive to implement and automatically correlates physical objects to information systems. Just like a human can be identified by a name, a barcode gives a name to any object and allows automatic capture of that name through various scanning devices, also known as scanners or readers. The readers may detect return laser light scanned across the barcode, or may capture return light from the barcode as an image. The return light is processed by computerized information systems where decisions may be made regarding each object, such as its price, manufacturer, date of manufacture, distribution chain, inventory level, etc.

Object identification data may be encoded as a series of elements of different light reflectivity printed on a label. The elements are spaced apart widthwise of the label along a horizontal direction to form a one-dimensional (1D) barcode or symbol. The elements may be configured as rectangular bars having variable widths and spaced apart from one another to form other elements, i.e., spaces, which also have variable widths. The heights of the bars and spaces in the 1D barcode, as considered along a vertical direction heightwise of the label, carries no information. The printed bars are typically colored with a foreground color, typically black, while the spaces are colored with a contrasting background color, typically white. The particular layout of the bars and spaces, as well as the sizes of the widths of the bars and spaces, describe one of many different schemes or symbologies in which the identification data is encoded and decoded.

To encode additional information, a plurality of 1D barcodes may be stacked along the vertical direction, or a combination of the elements may be arranged along both the horizontal and vertical directions, to encode the additional information to form a two-dimensional (2D) barcode or symbol. To encode still more information, it is known to configure the elements with three dimensions, such as particles, that are raised relative to the label and can, for example, be tactilely felt when touched. The variable depths of the particles, as considered in a direction perpendicular to the label, form a three-dimensional (3D) barcode or symbol. It is possible to encode still more information by forming a four-dimensional (4D) barcode or symbol in which the particles exhibit characteristic colors that can be contrasted with the background color, or from the label, and/or from the object to which the particles have been applied.

In order to capture depth information in photography, it is known to capture two images from different horizontal positions to obtain a stereoscopic image pair. This can be done by utilizing two separate side-by-side cameras, or by moving one camera from one position to another between image exposures, or by incorporating two or more side-by-side lenses in a stereo camera. It is also known to use a camera in a smartphone, or a stand-alone camera, to capture 3D models of real-world objects by simply moving the camera around the object of interest and by capturing several images with the camera.

However, such known depth capture techniques have not always proven to be altogether satisfactory, because the relatively small depths of the raised 3D particles are difficult to accurately resolve. Also, such known depth capture techniques cannot be performed at the relatively fast speed that is needed to capture a barcode in many commercial applications. For example, when objects and packages are moving quickly on a conveyor belt or along a supply chain, the speed of image capture and decoding the depth information in the barcode is critically important. While it may be acceptable for a typical consumer to move an image capture device relative to a multi-dimensional barcode, it is not a viable option in the real-world to simply move the image capture device around the object of interest to capture several images in supply chain applications.

Hence, as satisfactory as such multi-dimensional barcodes have been in storing information, it is desired to still further increase the amount of information encoded therein, without compromising the ability to accurately and rapidly decode the encoded information, especially in commercial applications. Accordingly, it is desired to increase the capacity or density of information encoded in a multi-dimensional barcode, and to more accurately and rapidly decode the encoded information therein.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
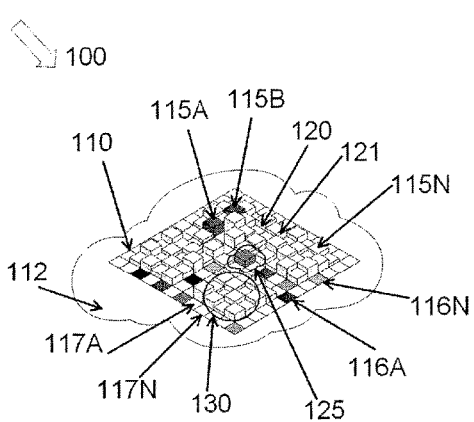
FIG. 1A is a broken-away, perspective view of one embodiment of a five-dimensional (5D) barcode on a label on an object.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present invention.

The system and method have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In accordance with one feature of this invention, a system for reading a multi-dimensional barcode for authenticating an object associated with the barcode, comprises a portable, fixed, or handheld image capture device for aiming at the object to capture return light as an image(s) from the barcode, and a processor for decoding information encoded in the barcode and/or verifying from the image/images of the barcode that the object is authentic.

In accordance with still another feature of this invention, a multi-dimensional barcode on a label utilizes the width, height, and depth of a plurality of elements (three dimensions or characteristics), the color of the elements (a fourth dimension or characteristic), and the color and/or other characteristics of a surrounding media (a fifth dimension or characteristic), for encoding information in the barcode. The barcode can also utilize a random distribution of such elements of different shape, width, height, depth, and color, and a characteristic of the surrounding media encasing these elements for authenticating an object to which the barcode is associated. The label may comprise a generally planar substrate, and may also include a first dataset encoded with the information, and a second dataset used as an address to store the information in a database. The elements are light-modifying to enable a portable, handheld, or a fixed image capture device aimed at the label to capture return light from the elements and to process the captured return light to generate an image pattern of the elements used for encoding information, or for comparison with an authentication pattern fingerprint. The elements are machine-readable to assist in decoding or for comparison of the authentication pattern fingerprint.

As mentioned earlier, in addition to the shape, size or color of the surrounding media, other characteristics, such as fluorescent dyes, or the addition of rare earth trace materials, or plant-based DNA markers, can also be used in constituting structured 5D barcodes or multi-dimensional random barcodes. For example, DNA derived from plant-based materials can be mixed in with the ink used in the printing of the second dataset, or DNA ink/material can be deposited anywhere on the label, or on the object, or the DNA can be the part of the surrounding media holding the elements to complement the authentication described herein. This DNA serves as a unique identifier, for example, to identify the source or manufacturer of the object. An additional light source and/or optical filter may be used, if necessary, for obtaining images of fluorescent markers, or special readers or devices may be used for tracking rare earth trace materials and DNA.

In terms of information density, a simple 2D barcode can encode a URL to a picture on the internet. A 3D barcode may be able to encode an entire picture in the barcode itself. A 4D barcode may encode even a short video in the barcode itself. Using 4D barcodes, it may be possible to make product information internet independent, and even repair instructions may be put on an appliance/product itself. If a 4D barcode has a random distribution of 3D color elements, such as rectangles, cubes, spheres or prismatic elements that are associated with an object, then that object becomes unique and cannot be counterfeited. A 5D barcode may encode still more data pertinent to a product, or its features, or to a video or information related to the genuineness of the product.

This invention describes a method of creating multi-dimensional barcodes from 3D elements by incorporating features of width, height, depth, and color of the 3D elements, as well as a characteristic of a surrounding medium to create 3D, 4D or 5D barcodes. An object having such a barcode associated with it can be identified or authenticated by aiming a portable, handheld, or fixed image capture device suitably modified as described below to capture visible characteristics of the multi-dimensional barcodes as one or more images, verifying from the image(s) that the 3D elements are three-dimensional and of varying elevation (depth), and/or that the 3D elements are colored, and/or that the surrounding medium encasing the 3D elements is of the right shape, characteristic and color.

Such an image or images are processed to deduce the information embedded in the multi-dimensional barcode according to rules used in creating the structured barcode multi-dimensional symbology, or by comparing the captured image to a stored image in a remote database. The information stored in the multi-dimensional barcode will be derived by knowing the image pattern of the 3D elements, the depth of each element, the color of each element, and the color, characteristic, and of a surrounding medium encasing the 3D elements. For a random distribution of colored 3D elements with a surrounding medium, an image or images may also be processed to generate an image pattern of the elements, by comparing the image pattern with an authentication pattern fingerprint stored in a remote database, by verifying the correct color values of the identified elements, by verifying the color and shape or any other characteristics of the surrounding medium, and by indicating that the object is authentic when the image pattern matches the authentication pattern fingerprint, the colors of the elements, and the color, characteristic and shape of the surrounding medium. The method relies on the analysis of the visual information, the color information of the 3D elements, color, size and shape or any other characteristics of the surrounding medium around the 3D elements and is invariant to environmental conditions and places no constraints on the user, equipment, lighting, or any other variable.

Figure 1B:
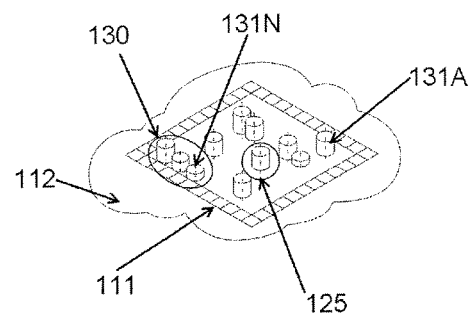
FIG. 1B a broken-away, perspective view of another embodiment of a 5D barcode on a label on an object.
Figure 2:
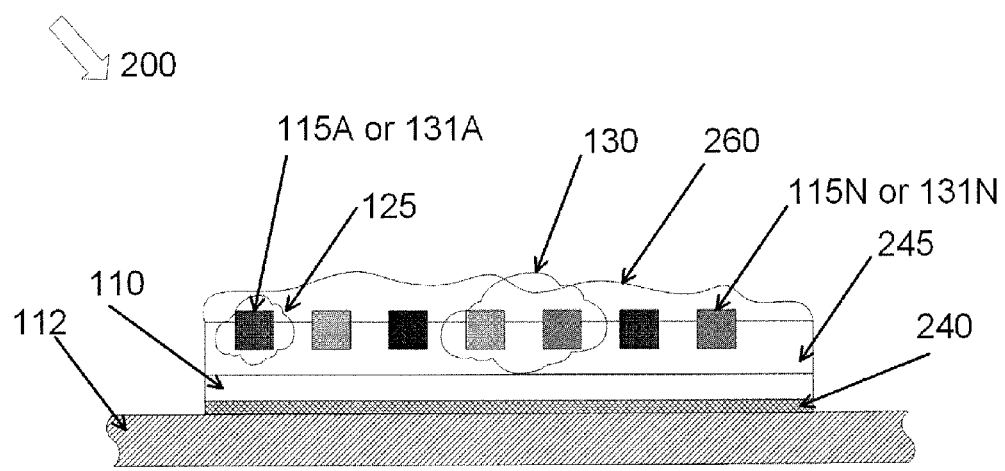
FIG. 2 is a broken-away, enlarged, sectional view of the 5D barcode in accordance with either of the embodiments of FIG. 1A or 1B.

Turning now to the drawings, reference numeral 100 in FIG. 1A identifies one embodiment of a multi-dimensional barcode on a label 110 affixed to an object 112. Preferably, the label 110 has a generally planar substrate, e.g., paper, foil, or film, and an adhesive layer 240 (FIG. 2) on the underside of the substrate for adhering the label 110 to the object 112. The substrate may be of one-piece or multi-partite design. The substrate may also contain anti-tampering qualities, such as the use of destructible material, or the presence of an underlying VOID pattern in case of attempted removal, and the like. The multi-dimensional barcode 100 includes a plurality of colored three-dimensional (3D) elements 115A, 115B, . . . 115N configured as a predefined symbology. The colors of the 3D elements could be all different, or could be all the same. In FIG. 1B, another embodiment of a multi-dimensional barcode on a label 111 shows a random distribution of a plurality of colored 3D elements 131A . . . 131N affixed on the label substrate and representing an optical fingerprint. The 3D elements 115A . . . 115N or 131A . . . 131N are visible elements and may be configured as raised particles and/or bubbles and/or depressions and/or like structures and/or combinations thereof. These 3D elements can be of any shape or size, e.g., cubic, pyramidal, cylindrical, conical, spherical, parallelepiped, or any other shape. The 3D elements exhibit characteristic colors that can be identified visually from a background color of the label 110, 111 and/or object 112.

Cells 116A . . . 116N and 117A . . . 117N in FIG. 1A represent two-dimensional (2D) elements consisting of colored or black and white zones or modules arranged in either a square or rectangular pattern, as is typically done in 2D barcodes, such as a data matrix code, a QR code, or a like code. Cells 116A . . . 116N and 117A . . . 117N can also represent bars and spaces of a one-dimensional (1D) barcode, or may be configured in any other shape, such as dots, triangles, trapezoids, or any geometric figure. These cells may represent binary bits. For example, a light cell may represent a "0", and a dark cell may represent "1", or vice versa. A combination of 3D elements and 2D cells allows significant more encoding information than a 2D symbology alone. The 3D elements can be of different colors, or of the same color, and of different depths. For example, numeral 120 represents a protruding 3D element of one height or elevation, while numeral 121 represents a 3D protruding element of a different height or elevation.

Some or all of these 3D elements 115A . . . 115N or 131A . . . 131N can be encased in a surrounding medium 125 to protect them and/or to provide more information encoding. Advantageously, the surrounding medium 125 is polyurethane or any other polymer that can be sprayed on, or poured over, or applied onto the 3D elements. The surrounding medium 125 may encase a single 3D element, while another surrounding medium 130 may encase multiple 3D elements. The surrounding media 125, 130 may be of different colors or the same color. Instead of encoding information with the color(s) of the surrounding media 125, 130, other characteristics of the media 125, 130, such as their shape, their size, their depth, their index of refraction or reflection, or a combination of some or all of these characteristics can also be utilized.

Although illustrated as cubical and cylindrical, the 3D elements 115A . . . 115N or 131A . . . 131N can have any shape, color, material, interior structure (hollow or solid), or size. The 3D elements 115A . . . 115N or 131A . . . 131N may be ink jet-printed on the label substrate, or mixed in a viscous, curable medium 245, as shown in the multi-dimensional barcode 200 of FIG. 2, and the mixture spread on the label substrate for curing, or by being adhered directly to the label substrate or the object 112, or by being applied or adhered directly to a card or tag remote from the object 112. Although illustrated as occupying a square/cubical area on the label 110, the 3D elements 115A . . . 115N or 131A . . . 131N can occupy different geometrical shapes, such as rectangular, triangular, spherical, circular, or oval areas, on the label substrate. The 3D elements 115A . . . 115N or 131A . . . 131N can be deposited in a single layer, or in multiple layers, on the label substrate. The depth of each 3D element can be different as shown by 120 and 121 depending on the symbology or optical fingerprint definition. The 3D elements 115A . . . 115N or 131A . . . 131N N can be fully, or partially, embedded in the medium 245, and may be overlaid with a transparent overcoat 260 for additional protection. Advantageously, the medium 245 and the overcoat 260 may be the same material. The 3D element that is individually surrounded by the medium 125, or the 3D elements that are collectively surrounded by the medium 130, are visible through the medium 245 and the overcoat 260. In some embodiments, the 3D elements and their surrounding media may only be visible under ultra-violet or infra-red light. The above-described characteristics of the media 125, 130, and 245 and/or of the overcoat 260, adds another level of encoding information to the barcode and forms a five-dimensional (5D) barcode on the label 110 or 111.

Figure 3:
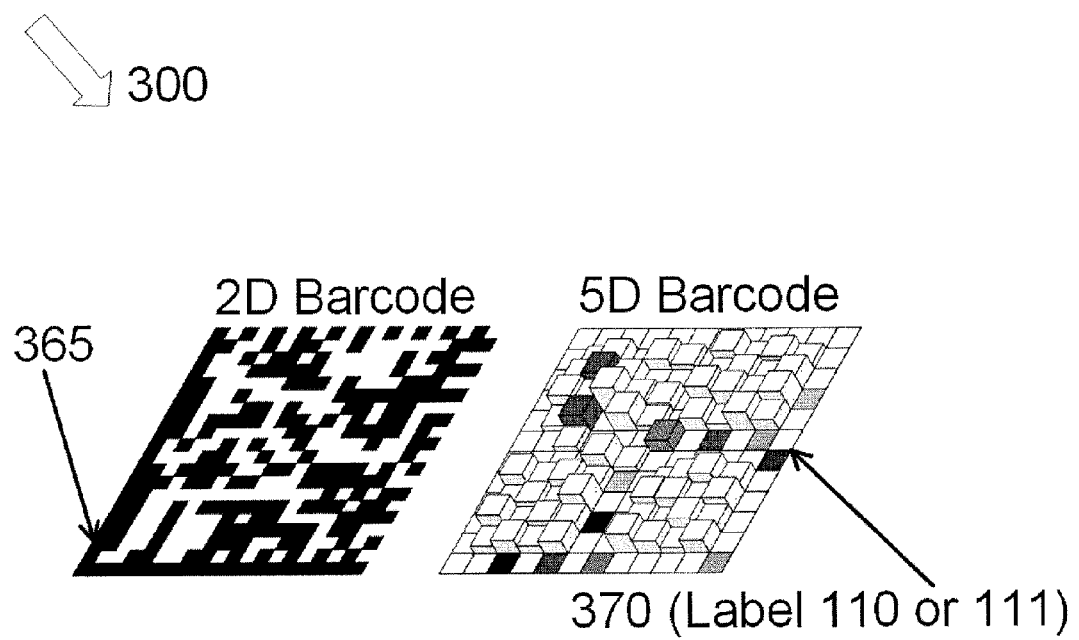
FIG. 3 is a perspective view of a composite barcode that includes the 5D barcode of either of the embodiments of FIG. 1A or 1B as a first dataset, and that includes another barcode as a second dataset.

FIG. 3 depicts a composite barcode 300 consisting of a 5D barcode that acts as a first data set 370, and another barcode, e.g., a 2D barcode, that acts as a second dataset 365. As illustrated, the second dataset 365 is a 2D barcode, e.g., a data matrix code, comprised of a plurality of data elements printed with ink on the label substrate, with some of the data elements being light-absorbing (black), and others of the data elements being light-reflective (white). The second dataset 365 need not be the 2D barcode as illustrated, but could be any other 2D barcode, e.g., a portable document format (PDF417) symbol, or a one-dimensional symbol, such as a universal product code (UPC) symbol, or a truncated symbol, or a stacked symbol, or could be a serial number composed of alphanumeric characters, or an RFID tag, or a code encoded in a magnetic stripe, or it could be another 5D symbol. The second dataset 365 may be comprised of bars, dots, or other shapes and characters. The first dataset 370, which includes the label 110 or 111, and the second dataset 365 can be applied anywhere on the label substrate and/or object, for example, to distinct areas adjacent to each other on the label substrate, or they can partially overlap each other on the label substrate, or they can completely overlap each other on the label substrate, or they can be at different places from each other, or they could be part of the same label.

Figure 4:
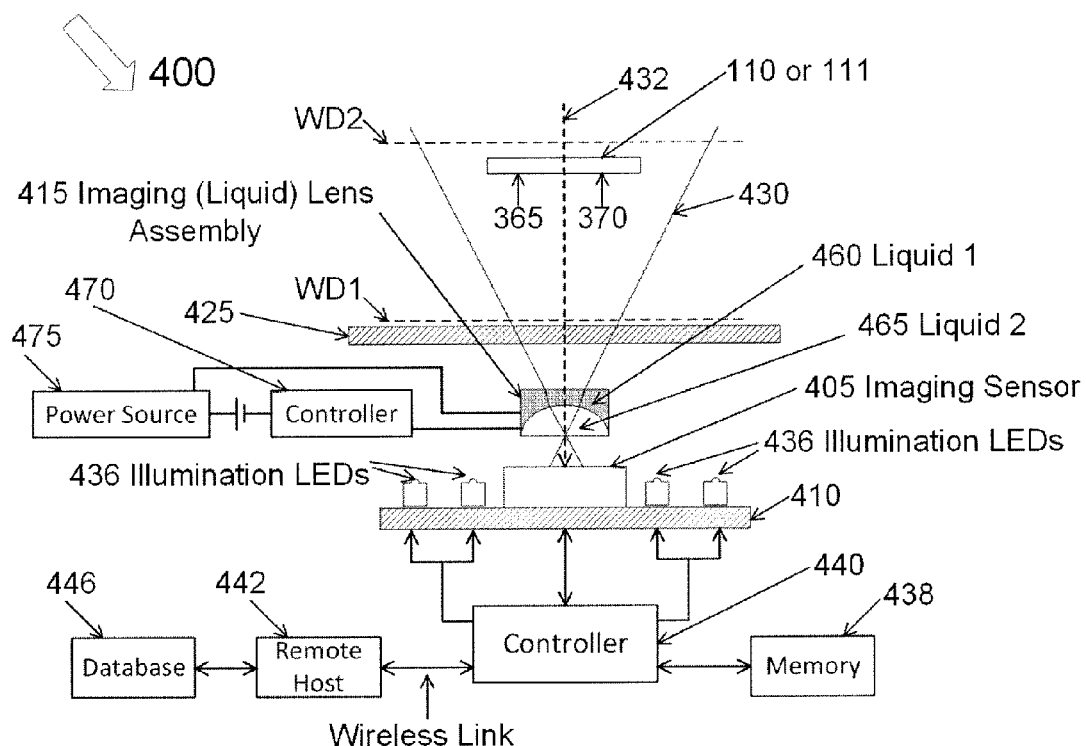
FIG. 4 is a part-sectional, diagrammatic view of one embodiment of an image capture arrangement using a liquid lens to capture at least one image of the 5D barcode of either of the embodiments of FIG. 1A or 1B.
Figure 5:
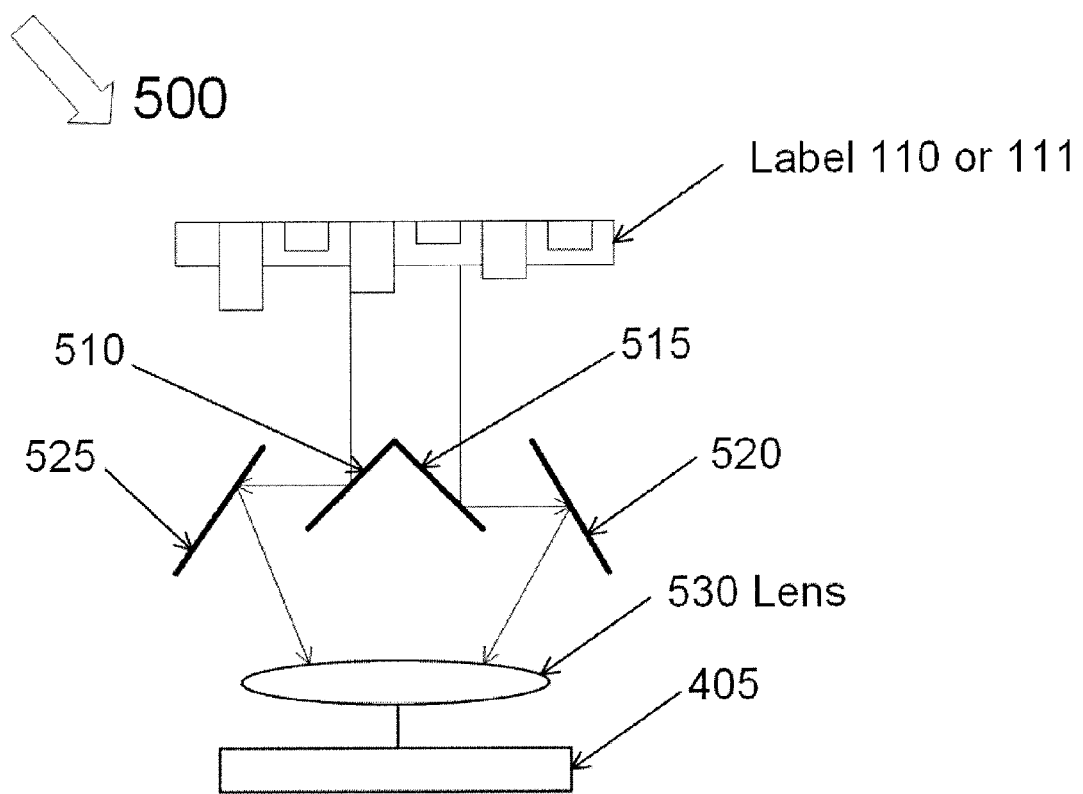
FIG. 5 is a schematic view of another embodiment of an image capture arrangement using multiple mirrors or lenses/prisms to capture at least one image of the 5D barcode of either of the embodiments of FIG. 1A or 1B.
Figure 6:
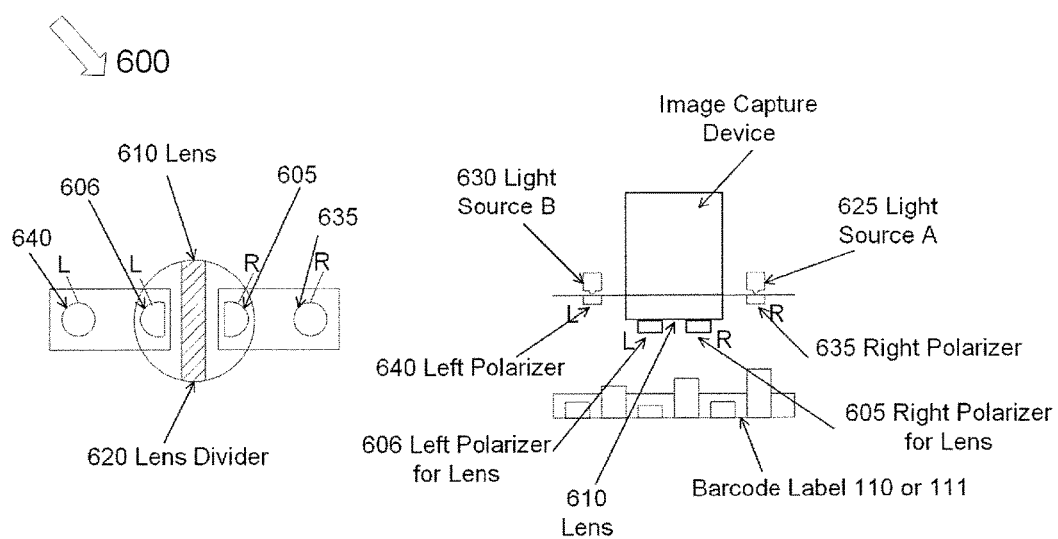
FIGS. 6A and 6B together constitute schematic views of still another embodiment of an image capture arrangement using polarizers, beam splitters, and lens dividers to capture at least one image of the 5D barcode of either of the embodiments of FIG. 1A or 1B.

FIGS. 4, 5, and 6 depict various embodiments of imaging modules that may be used to capture and process one or more images of a 5D barcode. The imaging module may be a stand-alone device, or may be built into such electronic devices as cellular telephones or smartphones, personal digital assistants (PDAs), tablets, computers, e-readers, media players, watches, eyeglasses, or like electronic devices.

As shown in the embodiment of FIG. 4, the imaging module includes an imaging sensor 405 built into an electronic device 400 and operable at a frame rate of multiple frames per second. The imaging sensor 405 is mounted on a printed circuit board (PCB) or any other substrate. An imaging lens assembly 415 is mounted in front of the imaging sensor 405. The imaging sensor 405 is a solid-state device, for example, a two-dimensional charge coupled device (CCD) or a complementary metal oxide semiconductor (CMOS) device, and has a 2D planar array of addressable photocells or pixels, preferably of submegapixel or supermegapixel size, having a reading field of view 430 that diverges away from a window 425 in both horizontal and vertical directions. The window 425 is supported on either a front or a back wall of the device 400. The imaging lens assembly 415 has an optical axis 432 generally perpendicular to the array of the image sensor 405 and is operative for capturing return light through the window 425 from the barcode on the label 110 or 111 of FIGS. 1A, 1B that is located in a range of working distances along the optical axis 432 between a close-in working distance (WD1) and a far-out working distance (WD2), and for projecting the captured return light onto the image sensor 405.

As also shown in FIG. 4, an optional illumination light system can be mounted in the device 400 and preferably includes a plurality of illumination light sources, e.g., two pairs of light emitting diodes (LEDs) 436, mounted on the PCB 410 and arranged at opposite sides of the imaging sensor 405 to uniformly illuminate the first and second datasets 365, 370 of the barcodes on the label 110 or 111 with illumination light. The optional illumination light is preferably in the visible range of wavelengths, but could also be in the infra-red (IR) or the ultra-violet (UV) range of wavelengths.

FIG. 4 also shows that the imaging sensor 405 and the illumination LEDs 436 are operatively connected to a controller or programmed microprocessor 440 on-board the device 400 and operative for controlling the operation of all these electrical components. An on-board memory 438, either internal to or external of the controller 440, is accessible to the controller 440. A remote host server 442 located remotely from the device 400 may be operatively connected to the controller 440, typically via a wireless link transmitted by an antenna and to a remote database 446. As described below, the controller 440 is also operative for processing one or more of the images of the barcodes on the label 110 or 111. It will be understood that the capture of the return light also encompasses the capture of no or little return light, which occurs when all or most of the light incident on a light-modifying element (e.g., a black element or a depression) is fully or mostly absorbed.

In known image capture-based barcode readers, a barcode image is typically captured at a fixed focus as defined by the imaging lens assembly. This image is analyzed to decipher the coded structure of the barcode by the controller and/or by the host server 442. However, such fixed focus readers have a limited depth of field, and hence, they are not suitable for resolving 3D, 4D, or 5D characteristics of the barcode, and thus cannot readily read such multi-dimensional barcodes.

Hence, in accordance with this disclosure, a variable focus imaging lens assembly 415 is employed, and preferably, a liquid lens is employed to continuously change the focal distance of the barcode reader at a relatively high speed without any mechanical motion or scanning mechanisms. The liquid lens assembly 415 utilizes two immiscible liquids of the same density, but of different refractive indices, to create variable focus lenses of high optical quality. Numeral 460 identifies a first liquid 1, and numeral 465 identifies a second liquid 2. The two fluids, one an electrically conducting solution and the other one a non-conducting oil, are contained in a short container to form a hemispherical lens as shown in FIG. 4. The shape of the lens is adjusted by applying a DC voltage in a process called electrowetting. Electrowetting adjusts the liquid's surface tension, changing the radius of curvature in the meniscus and thereby the focal length of the lens. Controller 470 applies DC voltage from a DC power source 475 in a stepwise manner of small increments, or in a continuous mode, to the liquid lens 415. Successive images are then captured at the imaging sensor 405 at variable focal lengths as the curvature of the liquid lens 415 changes in response to DC voltage changes. By varying the voltage gradient, the liquid lens acts as a tunable focus lens. Extremely shock and vibration resistant, such a liquid lens is capable of seamless transition from convex (convergent) to concave (divergent) lens shapes with switching times measured in milliseconds. In addition, the boundary between the two fluids forms an extremely smooth and regular surface.

The density matching of the fluids makes the whole liquid lens very stable against mechanical shocks. The external shape of the liquid lens is fixed; there is no moving part: only the internal liquids change shape. The liquid lens is designed for visible light, but may be transparent as well in the near infra-red or ultra-violet spectrum. Another unique property of the liquid lens is its ability to achieve very fast random steps: a software algorithm allows a step by step approach of the best focus position. Liquid lens, being as fast in making large steps as small steps, enables smarter focus search. The liquid lens can be in front of the lens of the existing barcode reader lens (add-on design), or inside the optical stack, or even behind it. It may also replace the current imaging lens assemblies.

The extended depth range barcode reader of FIG. 4 allows transversal resolution across the extended depth range of the entire 3D barcode depth. Several extended depth of field images are captured in one action by rapidly scanning the entire extended depth of the barcode by varying the focal length of the imaging lens 415 within the duration of one or more exposures of the imaging sensor 405. The captured image is thus a fusion of a very large number of slices of images within the focus range of the barcode reader, and a reconstructed extended depth of field image is then created from these various slices. Such an approach eliminates the need for careful registration of multiple image slices, which is necessary in various optical sectioning methods that capture 3D images.

FIG. 5 depicts an optical system 500 that can be added to a fixed focus imaging lens assembly lens 530 mounted in front of the imaging sensor 405. Inner field mirrors 510 and 515 reflect light to outer field mirrors 520 and 525 that reflect light to the imaging lens 530 that focuses at least one captured image on the imaging sensor 405. In this embodiment, the image of the barcode on the label 110 or 111 can be captured from two different angles simultaneously. Mirrors 515, 520, 510 and 525 can be replaced by a combination of prisms, mirrors or other optical components, such as a lens shaped like a rhinestone, with a flat top and eight surrounding non-symmetrical facets, or other constructs with several symmetrical or non-symmetrical facets to capture images from multiple angles. The images from the facets can then be combined to derive information encoded in the 3D image.

In another optical system 600 shown in FIG. 6, a polarized imaging lens assembly is shown to capture multiple images at the same time to decipher the depth information encoded in a multi-dimensional barcode on the label 110 or 111. A lens assembly 610 has a right polarizer 605 and a left polarizer 606. The lens assembly 610 is divided by a divider 620 such that the right polarizer 605 is on the right side of the divider 620, and the left polarizer 606 is on the left side of the divider 620. The barcode on the label 110 or 111 is illuminated by one or two light sources, such as LEDs. As an example, a light source A, which is identified by the numeral 625, is on the right side of the lens assembly 610, and the light source B, which is identified by the numeral 630, is on the left side of the lens assembly 610. Under each light source is another polarized structure represented by numeral 635 under the right light source 625, and by numeral 640 under the left light source 630.

When the light source 630 on the left illuminates the barcode, the image is captured from one angle, because the polarizer on the right prevents light entering the lens assembly 610 on the left, and vice versa. The light sources 625, 630 are switched on and off very rapidly. In this manner, two images are captured quickly—almost simultaneously. These images are analyzed to decipher the depth of the barcode and the color of the barcode, as well as the color or any other characteristic of the surrounding media.

The embodiments described in FIGS. 4, 5, and 6 could be incorporated into any device with a built-in imaging module and with or without bidirectional data and/or video and/or text over a packet-based or non-packet-based communications network.

Figure 7A:
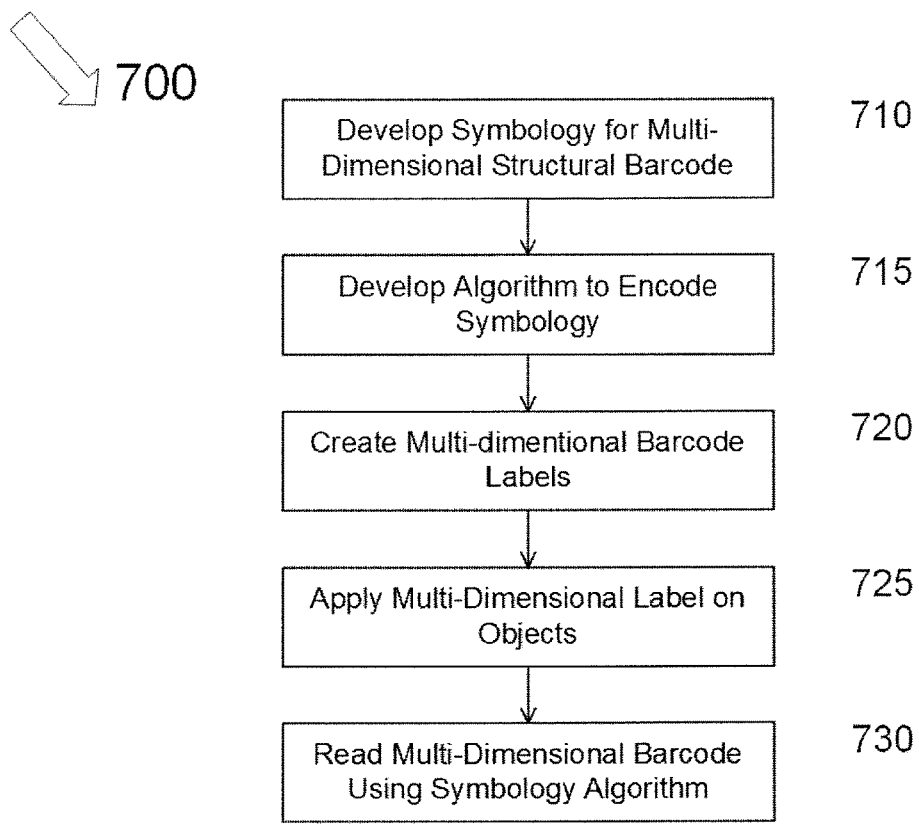
FIG. 7A is a flow chart depicting steps performed in creating the 5D barcode of FIG. 1A on a label for affixation to an object.

FIG. 7A is a flow chart depicting steps in the making and use of a multi-dimensional barcode on the label 110. In step 710, a symbology to create multi-dimensional (5D) elements 115A . . . 115N is generated. In step 715, an algorithm is created to convert the symbology into the physical structures to be used to represent the multi-dimensional barcode. The multi-dimensional barcode is then generated according to the algorithm pertinent to the symbology in step 720, and the labels 110 are then applied to the objects 112, or the elements are applied directly to the object 112 in step 725. In step 730, the multi-dimensional barcode is read using any of the specialized reader systems as described in FIGS. 4, 5 and 6.

Figure 7B:
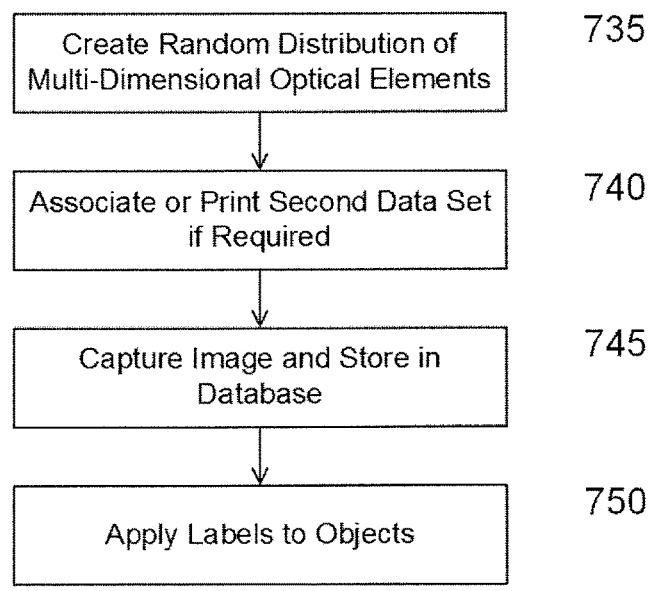
FIG. 7B is a flow chart depicting steps performed in creating the 5D barcode of FIG. 1B.

FIG. 7B is a flow chart depicting steps in the making and use of a multi-dimensional barcode on the label 111 as a plurality of randomly distributed elements 131A . . . 13N arranged in pattern in step 735. This randomly distributed pattern acts like an optical fingerprint and may be associated with another dataset in step 740. The randomly generated fingerprint pattern image is captured at the time of manufacture and stored in a database in step 745 for further authentication. The label 111 is applied to an object 112 in step 750. Alternately, the fingerprint can be applied directly to the object 112.

Figure 8A:
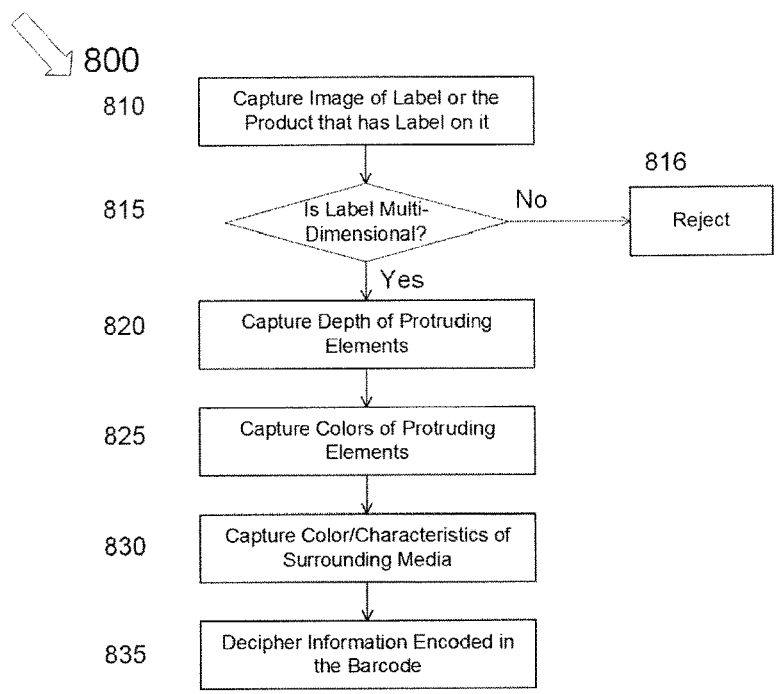
FIG. 8A is a flow chart depicting steps performed in reading a 5D barcode affixed to an object.

FIG. 8A is a flow chart depicting steps in capturing the information encoded in the multi-dimensional barcode associated with the object 112. In step 810, a user seeking to decode the information in the barcode attached to the object 112 aims the imaging device 400, 500, or 600 at the label 110 or at the labeled object 112, and the device software will automatically capture the image or images required for deciphering the encoded information. No special skill set is required by the user. The software in the image capture device automatically verifies, as described more fully below, that the 3D elements are indeed three-dimensional in step 815. If the elements are not three dimensional, then the barcode is rejected in step 816. In step 820, the depth of each of the raised, protruding elements 115A . . . 115N is measured, and in step 825, the color of each raised, protruding element 115A . . . 115N is captured. In step 830, the color or other characteristics of the surrounding media enclosing the 3D elements is captured. Based on the captured information in the above steps, the information encoded in the multi-dimensional barcode is decoded in step 835.

Figure 8B:
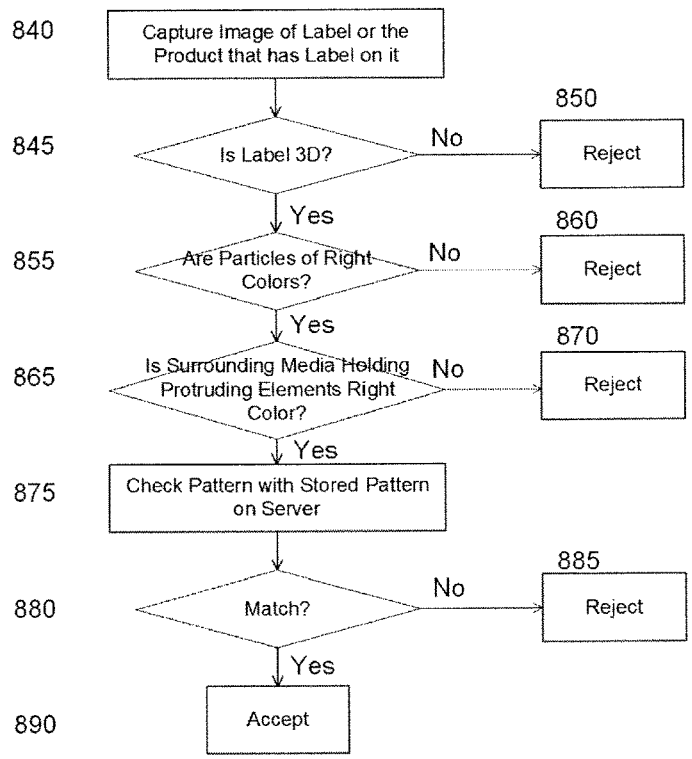
FIG. 8B is a flow chart depicting steps performed in authenticating a 5D barcode affixed to an object.

As discussed earlier, the randomly distributed multi-dimensional elements can be used as optical fingerprints for authentication of genuine vs. fake articles. FIG. 8B shows a flow chart describing the authentication utilizing a plurality of randomly distributed, multi-dimensional, raised, protruding elements 131A . . . 131N. FIG. 8B is a flow chart depicting steps in capturing the authentication information encoded in a multi-dimensional random fingerprint. In step 840, a user seeking to authenticate the object 112 aims the imaging device 400, 500, or 600 at the label 111, or at the labeled object 112, and the device software will automatically capture the image or images required for deciphering the optical fingerprint. No special skill set is required by the user. The software in the image capture device automatically verifies, as described more fully below, that the 3D elements are indeed three-dimensional in step 845. If the elements are not three dimensional, then the fingerprint is rejected in step 850. In step 855, the color of each of the raised, protruding elements 131A . . . 131N is captured. If the colors of the raised, protruding elements do not match with the stored information in the remote or local database, then the fingerprint is rejected as fake in step 860. In step 865, the color, shape, size or other characteristics of the surrounding media enclosing the 3D elements are captured, and if the colors or other characteristics of the surrounding media do not match with the stored information about the surrounding media in the remote or local database, then the fingerprint is rejected as fake in step 870. The captured pattern is checked against prestored pattern data at an addressable database locally, or at a remote site in step 875. The part or full verification of the fingerprint is performed by the software in the image capture device and by comparing the image pattern stored at the remote or local database, as discussed in U.S. Pat. No. 9,082,062 B2, whose entire contents are incorporated herein by reference thereto. The pattern matching takes place in step 880. If the pattern does not match, then the fingerprint is rejected in step 885. If the pattern matches, then the fingerprint is accepted as genuine in step 890. The sequence of these steps could be changed or performed in parallel. Also, when network connectivity is available, processing can be performed either on the device, on the server, or on a combination of both as required, desired, or necessitated.

For fingerprint authentication, the image pattern is remotely authenticated, typically by default. If the second dataset 365 is encoded with an address identifier, then the controller 440 sends the image pattern captured by devices 400, 500, or 600 to the remote host server 442 for the authentication pattern fingerprint. The remote host server 442 interrogates the remote database 546 with the extracted address. If there is a match, then the authentication is accepted; otherwise, the authentication is rejected. Alternately, the image matching and processing can be done on the device 400, 500, or 600 by extracting the stored image information from the remote server and remote database. Some of these steps could be combined. The image processing and decoding algorithm can include both a single element pattern and a global element pattern matching. The single element pattern assigns each multi-dimensional element a unique identifier and fingerprint depending on such characteristics as color, size, shape, and internal structure, surrounding media, and media color, and sorts all the fingerprints together to form a string. The global element pattern determines the center positions and the sizes of the elements, and the relative positions between the element centers to generate a global pattern template. The authentication pattern fingerprint could involve the concatenation of the single and global element patterns.

The barcode is preferably illuminated by the illumination LEDs 436. Alternatively, using multiple stereoscopic images captured from distinct viewpoints in relation to the label, or by using built-in or add-on stereoscopic attachments to acquire one or more images with such multiple viewpoints, or by using the liquid lens to capture the height of the barcode, or by using an optical system using the polarizer-based optical elements, or by capturing multiple images from various viewpoints manually or automatically by other means, the depth and the three-dimensionality of the elements can be evaluated based on the relative positions of the elements within the image(s) from varying viewpoints. In addition, the color of each barcode element is determined. From the acquired image(s), the individual color values for each of the elements is extracted in one or more color spaces as needed, including, but not limited to, color spaces such as RGB, CIE, YUV, HSL, and HSV. To account for varied lighting conditions, the colors can be distilled to their most basic parts, such as hue, to be used in the verification step. In this way, the system is invariant under varying lighting conditions. The image capture device also captures the color and other characteristics of the surrounding media. All this captured information is used to decipher the encoded information in the barcode.

Full encoding or decoding of information in the multi-dimensional barcode for verification of the authentication fingerprint pattern is dependent on all of the above described steps, including identification of three-dimensionality amongst the imaged 3D elements, matching the geometrical pattern from the 2D positional locations of the imaged elements, matching color characteristics of the 3D elements, and matching the color, shape, size and other characteristics of the surrounding media. A failure in any of these steps leads to a result of a negative authentication or an incorrect decoding.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, or contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A multi-dimensional barcode for storing information to be electro-optically read by image capture, comprising:
   a label having a substrate;
   a plurality of light-modifying elements mounted on, and raised relative to, the substrate and arranged along first and second directions that are orthogonal to each other in a pattern that stores first and second portions of the information, at least some of the raised elements having different heights along a third direction that is orthogonal to the first and second directions to store a third portion of the information, at least some of the raised elements being colored to store a fourth portion of the information; and a surrounding medium for at least partially encasing at least some of the raised elements, the surrounding medium having a characteristic that stores a fifth portion of the information, the surrounding medium being curable, light-transmissive medium that is applied over the raised elements and is cured in situ on and around the raised elements.

2. The barcode of claim 1, wherein the surrounding medium encases at least one of a single raised element and a plurality of the raised elements.

3. The barcode of claim 1, wherein the surrounding medium encases some of the raised elements, and wherein another surrounding medium having a different characteristic encases others of the raised elements.

4. The barcode of claim 1, wherein the characteristic of the surrounding medium is at least one of color, position, size and index of refraction.

5. The barcode of claim 1, and a topcoat overlying the surrounding medium.

6. The barcode of claim 1, wherein the raised elements are three-dimensional.

7. The barcode of claim 6, wherein the three-dimensional raised elements are randomly distributed on the substrate and serve as a first data set, and a second data set associated with, and located in proximity to, the first data set.

8. A system for electro-optically reading by image capture information stored in a multi-dimensional barcode, comprising:

an imaging sensor having an array of exposable photosensors for capturing return light from a plurality of light-modifying elements arranged along first and second directions that are orthogonal to each other in a pattern that stores first and second portions of the information stored in the barcode, at least some of the elements having different elevations along a third direction that is orthogonal to the first and second directions to store a third portion of the information, at least some of the elements being colored to store a fourth portion of the information, and a surrounding medium for at least partially encasing at least some of the elements, the surrounding medium having a characteristic that stores a fifth portion of the information;

an imaging assembly for collecting a plurality of images of the return light from the barcode over at least one exposure of the imaging sensor; and a controller for constructing at least one image of the barcode from the plurality of images collected by the imaging assembly, and for processing the at least one image to read all the portions of the information.

9. The system of claim 8, wherein the imaging assembly includes a liquid lens having a variable focus.

10. The system of claim 8, Wherein the imaging assembly includes a plurality of field mirrors.

11. The system of claim 8, wherein the imaging assembly includes a pair of light polarizers.

12. A method of electro-optically reading by image capture information stored in a multi-dimensional barcode, comprising:

capturing return light with an imaging sensor from a plurality of light-modifying elements arranged along first and second directions that are orthogonal to each other in a pattern that stores first and second portions of the information stored in the barcode, at least some of the elements having different elevations along a third direction that is orthogonal to the first and second directions to store a third portion of the information, at least some of the elements being colored to store a fourth portion of the information, and a surrounding medium for at least partially encasing at least some of the elements, the surrounding medium having a characteristic that stores a fifth portion of the information;

collecting with an imaging assembly a plurality of images of the return light from the barcode;

constructing with a controller at least one image of the barcode from the plurality of collected images; and processing with the controller the at least one image to read all the portions of the information.

13. The method of claim 12, and configuring the elements with three-dimensions, and mounting the three-dimensional elements on a label.

14. The method of claim 13, and randomly distributing the three-dimensional elements on the label to serve as a first data set, and associating a second data set with, and in proximity to, the first data set.

15. The method of claim 12, and associating the barcode with an object to be authenticated, and for authenticating the object when the processed at least one image of the barcode matches a known authentication pattern.

* * * * *